US010528307B2

(12) United States Patent
Kawasaki

(10) Patent No.: US 10,528,307 B2
(45) Date of Patent: Jan. 7, 2020

(54) INFORMATION PROCESSING APPARATUS INCLUDING ACCESS POINT FUNCTION, CONTROL METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Hiroki Kawasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/234,285

(22) Filed: Dec. 27, 2018

(65) Prior Publication Data

US 2019/0129664 A1    May 2, 2019

Related U.S. Application Data

(63) Continuation of application No. 15/600,603, filed on May 19, 2017, now Pat. No. 10,203,918.

(30) Foreign Application Priority Data

May 27, 2016 (JP) ................. 2016-106173

(51) Int. Cl.
| | | |
|---|---|---|
| G06F 3/12 | (2006.01) | |
| G06F 21/31 | (2013.01) | |
| G06F 21/60 | (2013.01) | |
| H04W 88/08 | (2009.01) | |

(52) U.S. Cl.
CPC .......... *G06F 3/1236* (2013.01); *G06F 3/1204* (2013.01); *G06F 3/1285* (2013.01); *G06F 3/1292* (2013.01); *G06F 21/31* (2013.01); *G06F 21/608* (2013.01); *H04W 88/08* (2013.01)

(58) Field of Classification Search
None
See application file for complete search history.

(56) References Cited

U.S. PATENT DOCUMENTS

2011/0131651 A1* 6/2011 Shanmugavadivel ....... H04W 12/12
726/22
2015/0319584 A1* 11/2015 Fink .................. H04W 88/08
370/338

* cited by examiner

*Primary Examiner* — Thomas D Lee
(74) *Attorney, Agent, or Firm* — Canon U.S.A., Inc. IP Division

(57) ABSTRACT

An information processing apparatus including an access point function includes a display unit that displays wireless connection information corresponding to the access point function, a determination unit that determines whether a user who issued an instruction for activating the access point function matches a user who logged into the information processing apparatus, and a control unit that controls the display unit to display the wireless connection information in a case where the determination unit determines that the user who issued the instruction for activating the access point function matches the user who logged into the information processing apparatus and not to display the wireless connection information in a case where the user who issued the instruction for activating the access point does not match the user who logged into the information processing apparatus.

14 Claims, 10 Drawing Sheets

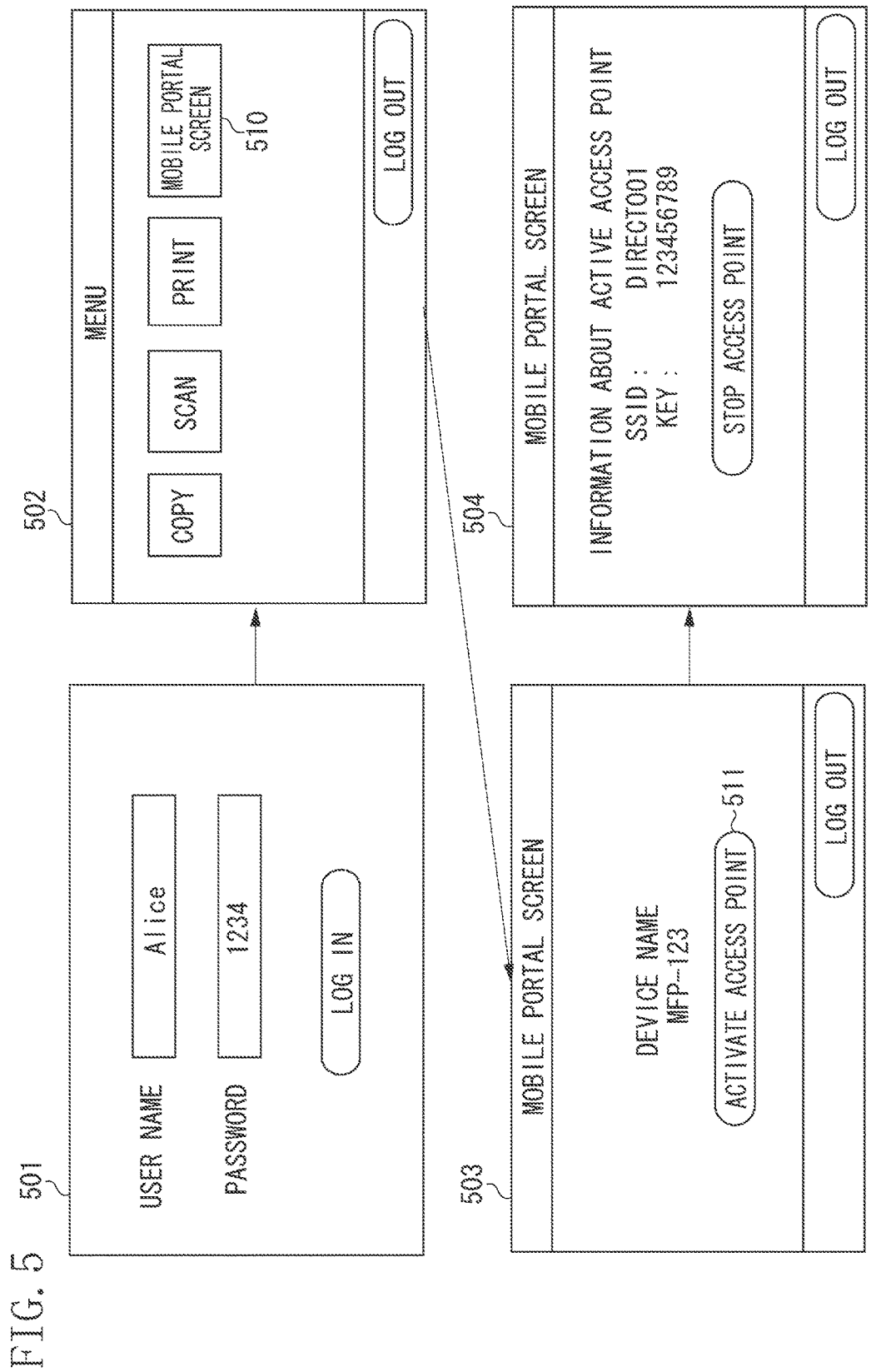

FIG. 6

```
                                                   601
 ┌──────────────────────────────────────────────────┐
 │         USER ACCOUNT REGISTRATION SCREEN         │
 ├──────────────────────────────────────────────────┤
 │  USER INFORMATION                                │
 │                                                  │
 │   USER NAME:         Alice                       │
 │    PASSWORD:         1234                        │
 │                                                  │
 │                                                  │
 │  AUTHORITY INFORMATION                           │
 │                                                  │
 │  PRINT:              PERMITTED                   │
 │  COLOR PRINT:        MONOCHROME PRINTING ONLY    │
 │  PRINTING METHOD:    TWO-SIDED PRINTING ONLY     │
 │  MOBILE PORTAL SCREEN: PERMITTED                 │
 │                         ·                        │
 │                         ·                        │
 │                                                  │
 ├──────────────────────────────────────────────────┤
 │                                                  │
 └──────────────────────────────────────────────────┘
```

INFORMATION PROCESSING APPARATUS INCLUDING ACCESS POINT FUNCTION, CONTROL METHOD FOR CONTROLLING INFORMATION PROCESSING APPARATUS, AND STORAGE MEDIUM

CROSS-REFERENCE TO RELATED APPLICATIONS

This application is a Continuation of U.S. patent application Ser. No. 15/600,603, filed on May 19, 2017, which claims the benefit of Japanese Application No. 2016-106173 filed May 27, 2016. These applications are hereby incorporated by reference herein in their entirety.

BACKGROUND

Field

The present disclosure relates to an information processing apparatus including an access point function, a control method for controlling an information processing apparatus, and a storage medium.

Description of the Related Art

In recent years, information processing apparatuses (e.g., printing apparatuses) each having a simple wireless local area network (LAN) access point function have been on the rise, and direct connection of a personal computer (PC) and a mobile terminal to the printing apparatus has enabled the PC and the mobile terminal to use a printing function of the printing apparatus (Japanese Patent Application Laid-Open No. 2015-23440). When a user uses the wireless LAN access point function, the user presses a wireless LAN access point start button displayed on an operation unit of the printing apparatus. When the start button is pressed, the printing apparatus generates wireless authentication information, such as a service set identifier (SSID) and a network key, and displays the wireless authentication information. In general, a wireless LAN access point connectable terminal can be connected to a wireless LAN access point activated by the printing apparatus when the wireless authentication information displayed on the operation unit of the printing apparatus is input.

The printing apparatus is generally used by multiple users. In some cases, wireless authentication information generated by operation performed by a certain user can be displayed when another user uses the printing apparatus. In such cases, the other user can also use a wireless direct function. As for the wireless LAN access point function of the printing apparatus, the number of concurrent connections can be small and limited. In such a case, there is a possibility that the user who generated the wireless authentication information may not be connected to the printing apparatus.

SUMMARY

According to an aspect of the present disclosure, an information processing apparatus including an access point function includes a display unit configured to display wireless connection information corresponding to the access point function, a determination unit configured to determine whether a user who issued an instruction for activating the access point function matches a user who logged into the information processing apparatus, and a control unit configured to control the display unit to display the wireless connection information in a case where the determination unit determines that the user who issued the instruction for activating the access point function matches the user who logged into the information processing apparatus and not to display the wireless connection information in a case where the user who issued the instruction for activating the access point does not match the user who logged into the information processing apparatus.

Further features will become apparent from the following description of exemplary embodiments with reference to the attached drawings.

BRIEF DESCRIPTION OF THE DRAWINGS

FIG. 5 is a diagram (a second diagram) illustrating an example of operation screens displayed on an operation unit of the printing apparatus.

FIG. 6 is a diagram illustrating an example of a screen via which a user account is registered.

DESCRIPTION OF THE EMBODIMENTS

Hereinafter, exemplary embodiments will be described with reference to the drawings.

Figure 1:
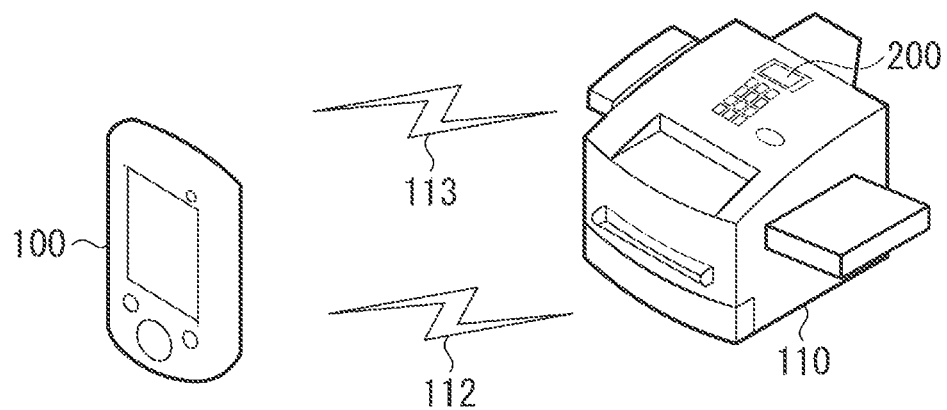
FIG. 1 is a diagram illustrating an example of a system configuration of a communication system.

A first exemplary embodiment will be described below. FIG. 1 is a diagram illustrating an example of a system configuration of a communication system. The communication system according to the present exemplary embodiment includes a mobile terminal 100 and a printing apparatus 110. The printing apparatus 110 includes a wireless access point function (a software access point mode) to operate as a wireless access point. The printing apparatus 110 can directly perform wireless communication with a terminal, such as the mobile terminal 100, via a wireless direct connection 112. The printing apparatus 110 can communicate with a terminal, such as the mobile terminal 100, via a short-range wireless connection 113 according to near field communication (NFC). The printing apparatus 110 includes an operation unit 200 on which an Internet Protocol (IP) address and network information, such as an SSID and an authentication key of the printing apparatus 110, can be displayed. The printing apparatus 110 serves as the wireless access point to provide the wireless direct connection 112. The printing apparatus 110 can transmit network information to the mobile terminal 100 using the short-range wireless connection 113. The printing apparatus 110 is an example of an image processing apparatus.

The mobile terminal 100 can execute wireless communication such as wireless fidelity (Wi-Fi®) communication. A user inputs an authentication key or an SSID of the printing apparatus 110 providing the wireless direct connection 112 into a communication setting screen of the mobile terminal 100. This enables the mobile terminal 100 to be connected to the wireless direct connection 112 of the printing apparatus 110. The mobile terminal 100 can find the printing apparatus 110 or a wireless access point in proximity to the mobile terminal 100 based on a response packet with respect to a wireless communication search packet or a beacon packet periodically transmitted by the access point.

Figure 2:
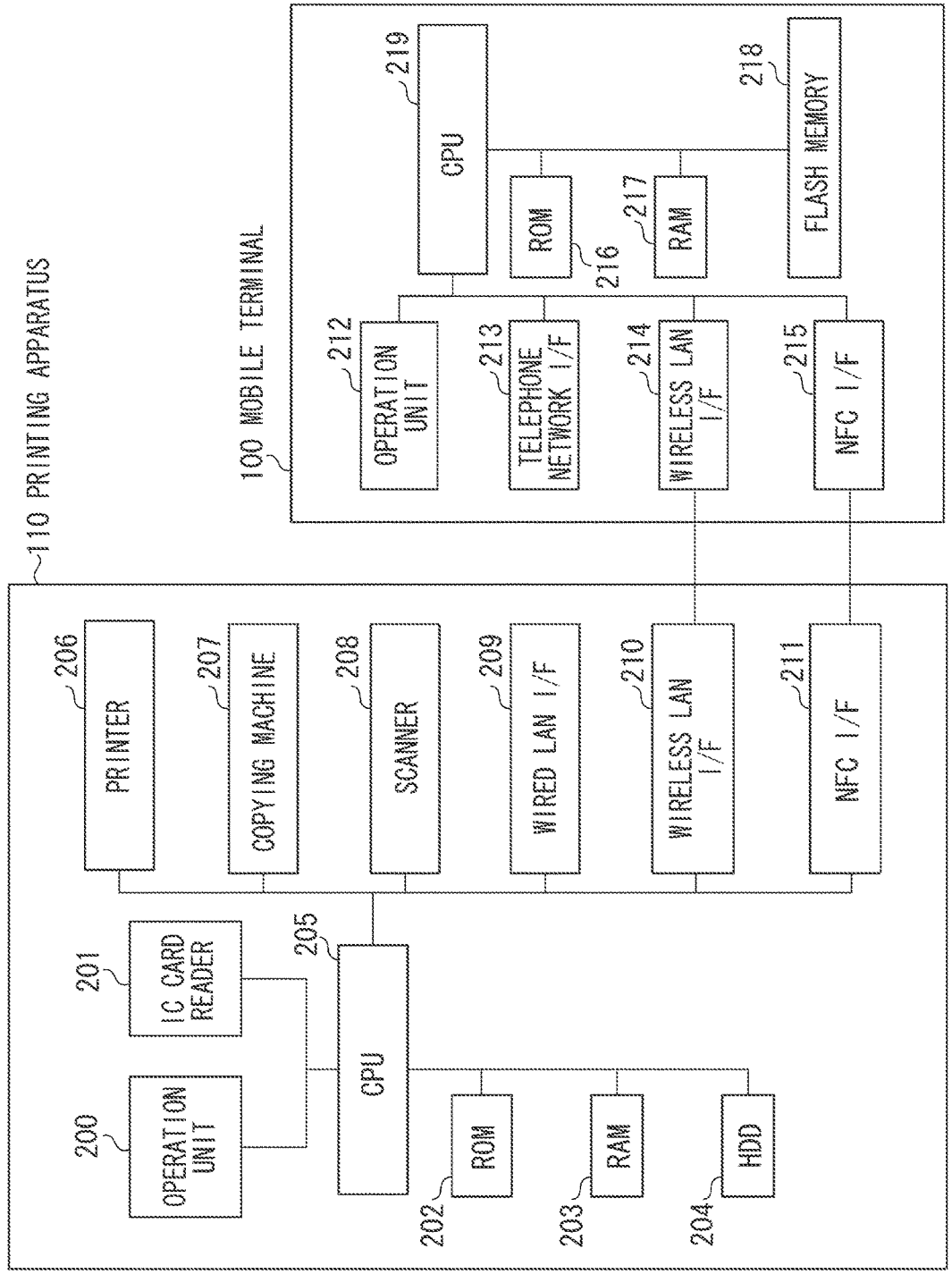
FIG. 2 is a diagram illustrating an example of a hardware configuration of a printing apparatus and a mobile terminal.

FIG. 2 is a diagram illustrating an example of a hardware configuration of the printing apparatus 110 and the mobile terminal 100. The printing apparatus 110 includes a printer 206, a copying machine 207, a scanner 208, the operation unit 200, an integrated circuit (IC) card reader 201 over which an IC card is held when a user logs in, and a central processing unit (CPU) 205 that controls each of these components. The printing apparatus 110 also includes a wired LAN interface (I/F) 209, a wireless LAN I/F 210, and an NFC I/F 211 as communication units. The printing apparatus 110 includes a read only memory (ROM) 202, a random access memory (RAM) 203, and a hard disk drive (HDD) 204.

The mobile terminal 100 includes an operation unit 212 operated by a user, a telephone network I/F 213, a wireless LAN I/F 214, an NFC I/F 215, and a CPU 219 that controls each of these components. The mobile terminal 100 also includes a ROM 216, a RAM 217, and a flash memory 218.

The printer 206 includes a receiving function. The printer 206, for example, forms an image corresponding to a print job received from a device, such as a PC connected to a wired LAN in the same network and a mobile terminal connected to a wireless LAN access point, to output the image on a sheet. Each of the copying machine 207 and the scanner 208 includes a transmission function. Each of the copying machine 207 and the scanner 208 optically reads an original image set on a scanner unit to output the read image as image data on a sheet. The wired LAN I/F 209 is not only a network connection unit for connecting the printing apparatus 110 to a LAN, but also an interface the printing apparatus 110 uses to cooperate with the PC connected to the same network. The wireless LAN I/F 210 includes a function as an access point for connecting the printing apparatus 110 to the mobile terminal 100. The use of the wireless LAN I/F 210 enables the printing apparatus 110 to directly communicate with the mobile terminal 100 connected to the access point. The NFC I/F 211, using NFC communication, can distribute information (in an NFC data exchange format (NDEF) used for publication of information about available services and a device name of the printing apparatus 110 to other devices.

Each of the functions of the printing apparatus 110 can be implemented by the CPU 205 dynamically controlling various hardware components 200, 201, and 206 to 211 of the printing apparatus 110. The CPU 205 transmits a signal to each of the various hardware components via a bus line. This enables the CPU 205 and each of the hardware components to mutually communicate data. The operation unit 200 serves as a user interface so that a user who uses the printing apparatus 110 can use the printer 206, the copying machine 207, the scanner 208, and the wireless LAN I/F 210. The operation unit 200 can be operated as a touch panel. The IC card reader 201 is used for authentication using an IC card.

Figure 3:
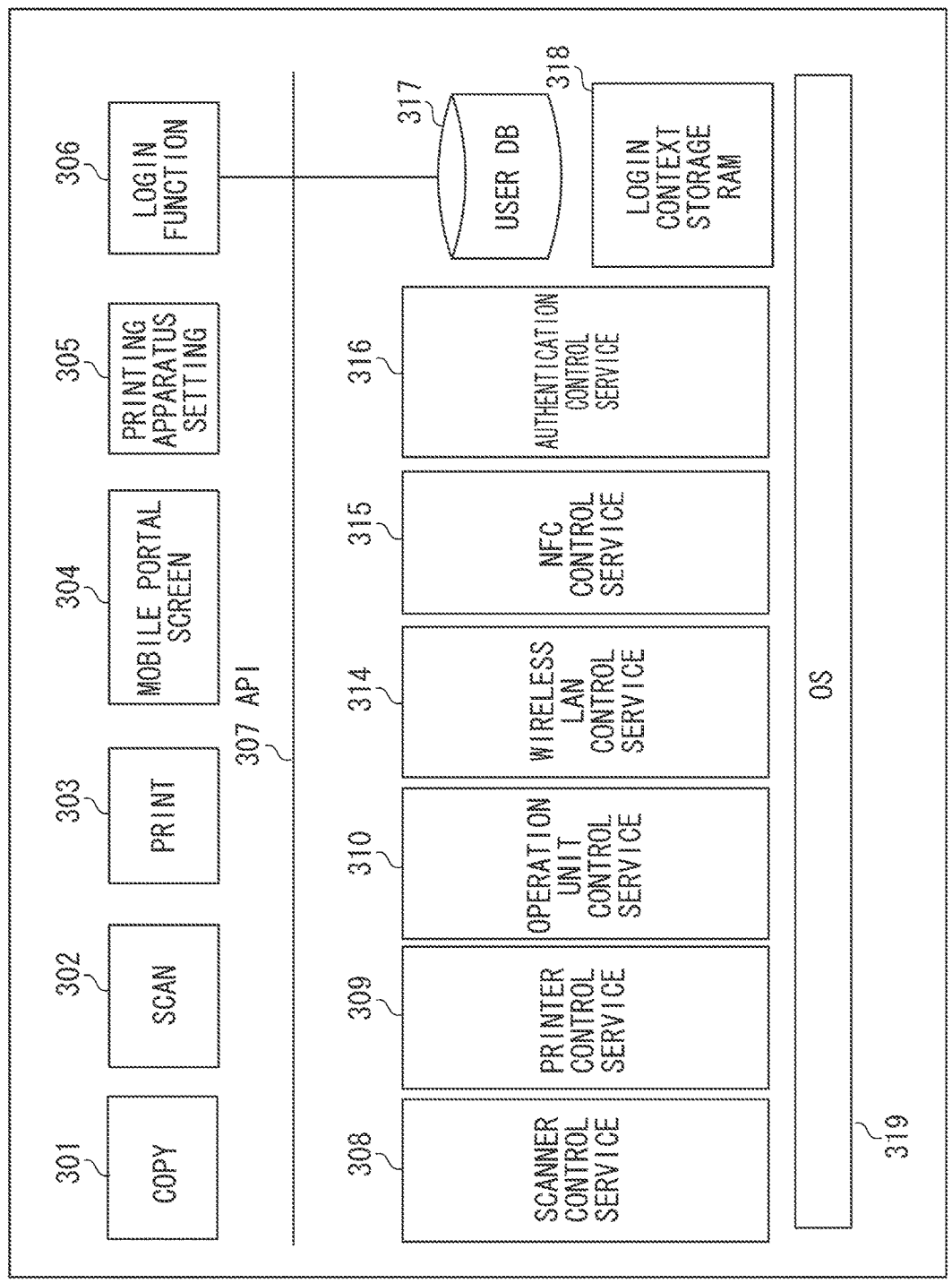
FIG. 3 is a diagram illustrating an example of a functional configuration of the printing apparatus.
Figure 7:
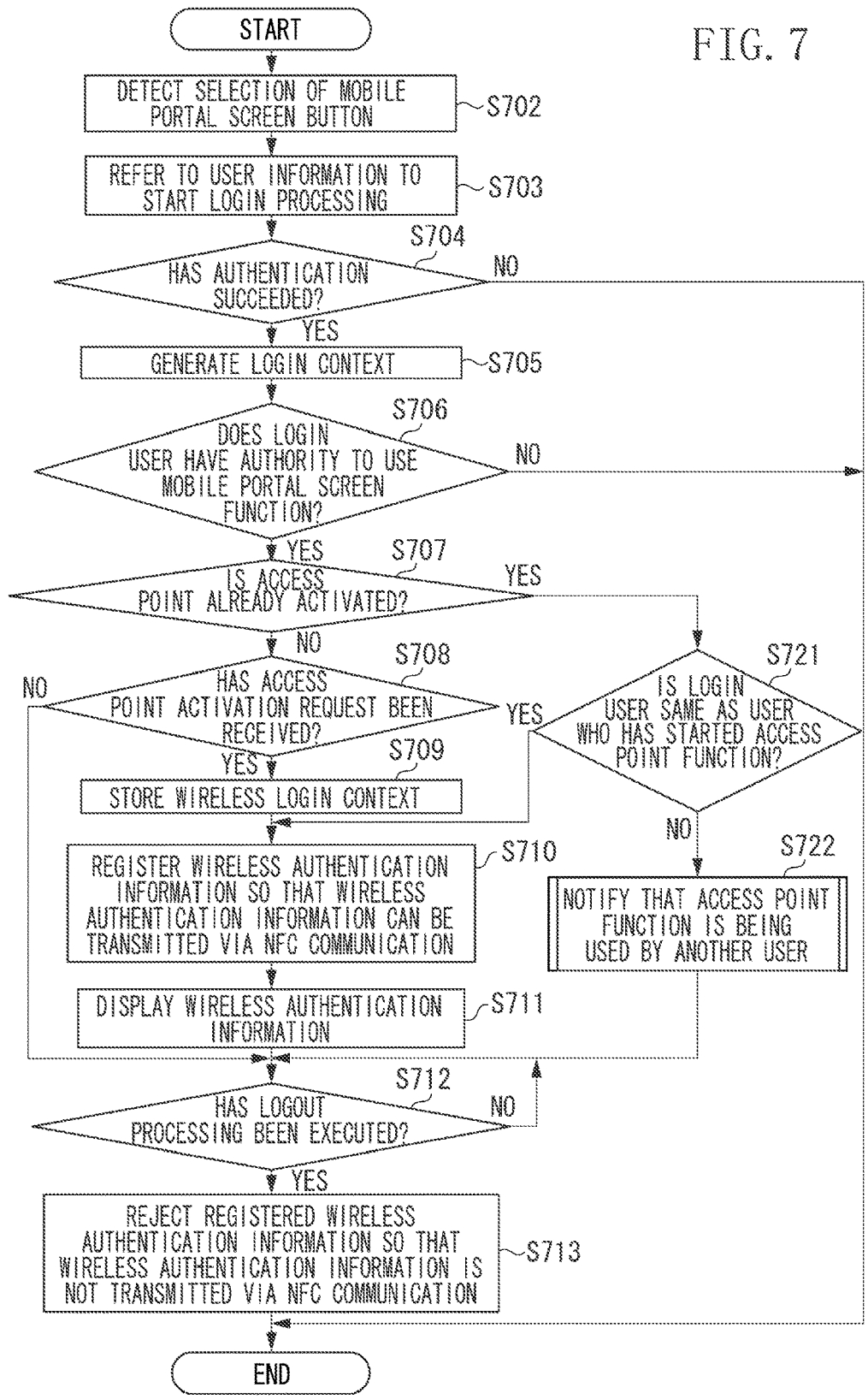
FIG. 7 is a flowchart illustrating an example of information processing performed by the printing apparatus according to a first exemplary embodiment.
Figure 10:
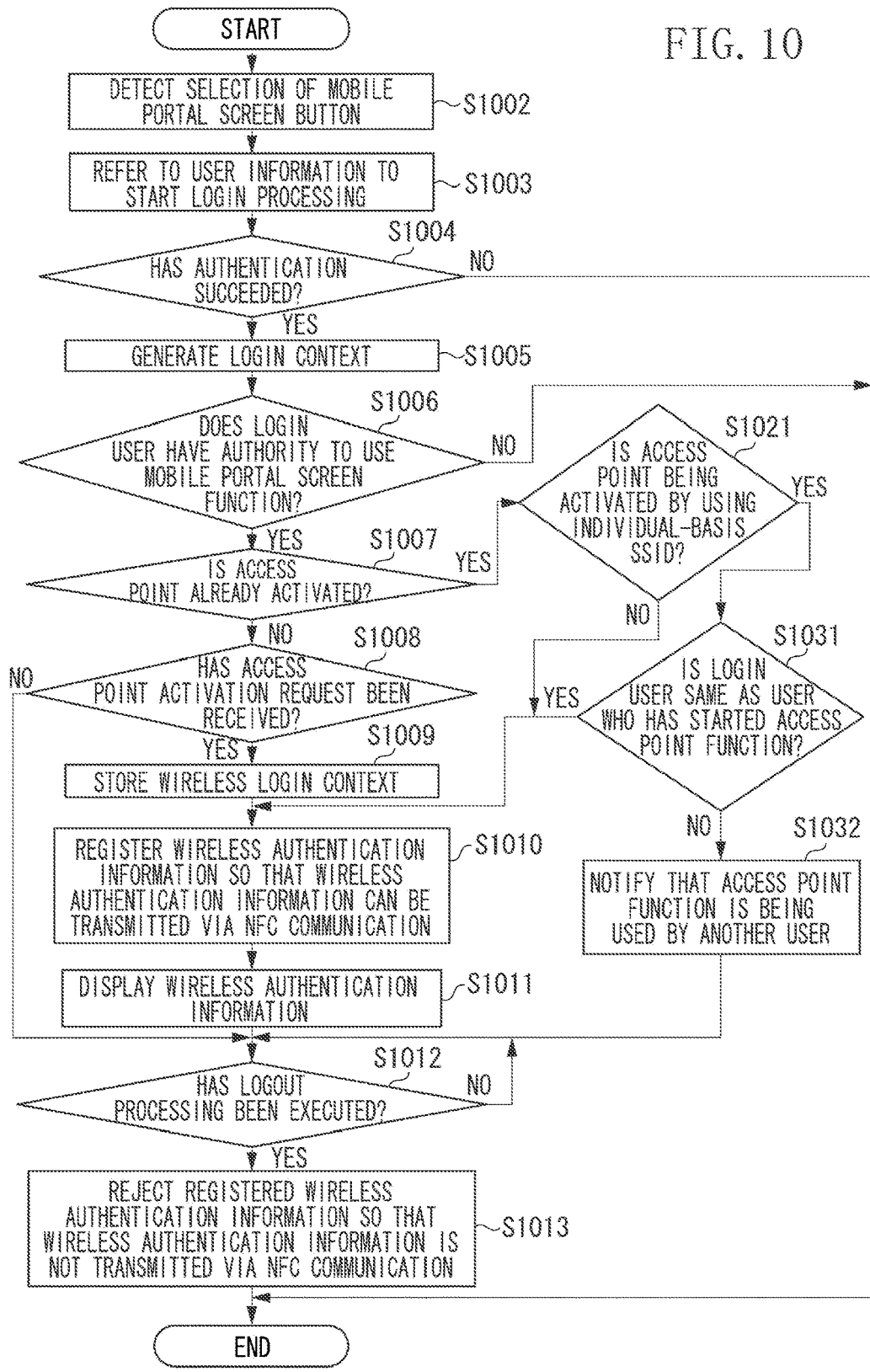
FIG. 10 is a flowchart illustrating an example of information processing performed by a printing apparatus according to a second exemplary embodiment.

The CPU 205 executes processing by using the RAM 203 based on a program stored in the ROM 202 or the HDD 204, so that a functional configuration of the printing apparatus 110 illustrated in FIG. 3 is provided and processing of a flowchart illustrated in each of FIGS. 7 and 10 is performed.

The telephone network I/F 213 provides a function as mobile communication using a telephone network. The wireless LAN I/F 214 enables the mobile terminal 100 to be connected to the printing apparatus 110 via a wireless LAN. The NFC I/F 215 enables the mobile terminal 100 to perform NFC communication with the printing apparatus 110.

The CPU 219 dynamically controls the hardware components 212 to 215 of the mobile terminal 100. The CPU 219 transmits signals to the various hardware components via a bus line to control functions of the telephone network I/F 213, the wireless LAN I/F 214, and the NFC I/F 215. The operation unit 212 is used for execution of the telephone network I/F 213 and the wireless LAN I/F 214 by a user who uses the mobile terminal 100. The operation unit 212 can be operated as a touch panel.

The CPU 219 executes processing by using the RAM 217 based on a program stored in the ROM 216 or the flash memory 218, so that the mobile terminal 100 performs processing.

FIG. 3 is a diagram illustrating an example of a functional configuration of the printing apparatus 110. As illustrated in FIG. 3, the printing apparatus 110 includes a copy 301, a scan 302, a print 303, a mobile portal screen 304, a printing apparatus setting 305, and a login function 306 as applications that operate on a platform. Such applications communicate with various control services by an application program interface (API) 307 so as to be activated. The various control services as a module group include a scanner control service 308, a printer control service 309, an operation unit control service 310, a wireless LAN control service 314, an NFC control service 315, and an authentication control service 316. The printing apparatus 110 includes a user database (DB) 317 for retaining user information and a login context storage RAM 318 for storing a login context of a user who has logged in. The printing apparatus 110 includes an operating system (OS) 319 that provides the module group with an interface including a hardware function.

Each of the copy 301, the scan 302, the print 303, the mobile portal screen 304, and the printing apparatus setting 305 provides a user interface operable by a user. The mobile portal screen 304 is a user interface for wireless connection of the printing apparatus 110 to the mobile terminal 100. The mobile portal screen 304 can connect the printing apparatus 110 to the mobile terminal 100 by activating an access point. When the mobile portal screen 304 is activated, the printing apparatus 110 displays a SSID and an authentication key on a screen thereof. A user inputs the SSID and the authentication key displayed on the screen of the printing apparatus 110 into the mobile terminal 100 to request the start of connection processing. After mobile print processing is finished, the user selects an access point stop button from the mobile portal screen 304 to issue a processing end instruction. The login function 306 provides a function for the user to log in the printing apparatus 110. The login function 306 uses the user DB 317 to register a new user, change user information, and to manage login users.

Figure 4:
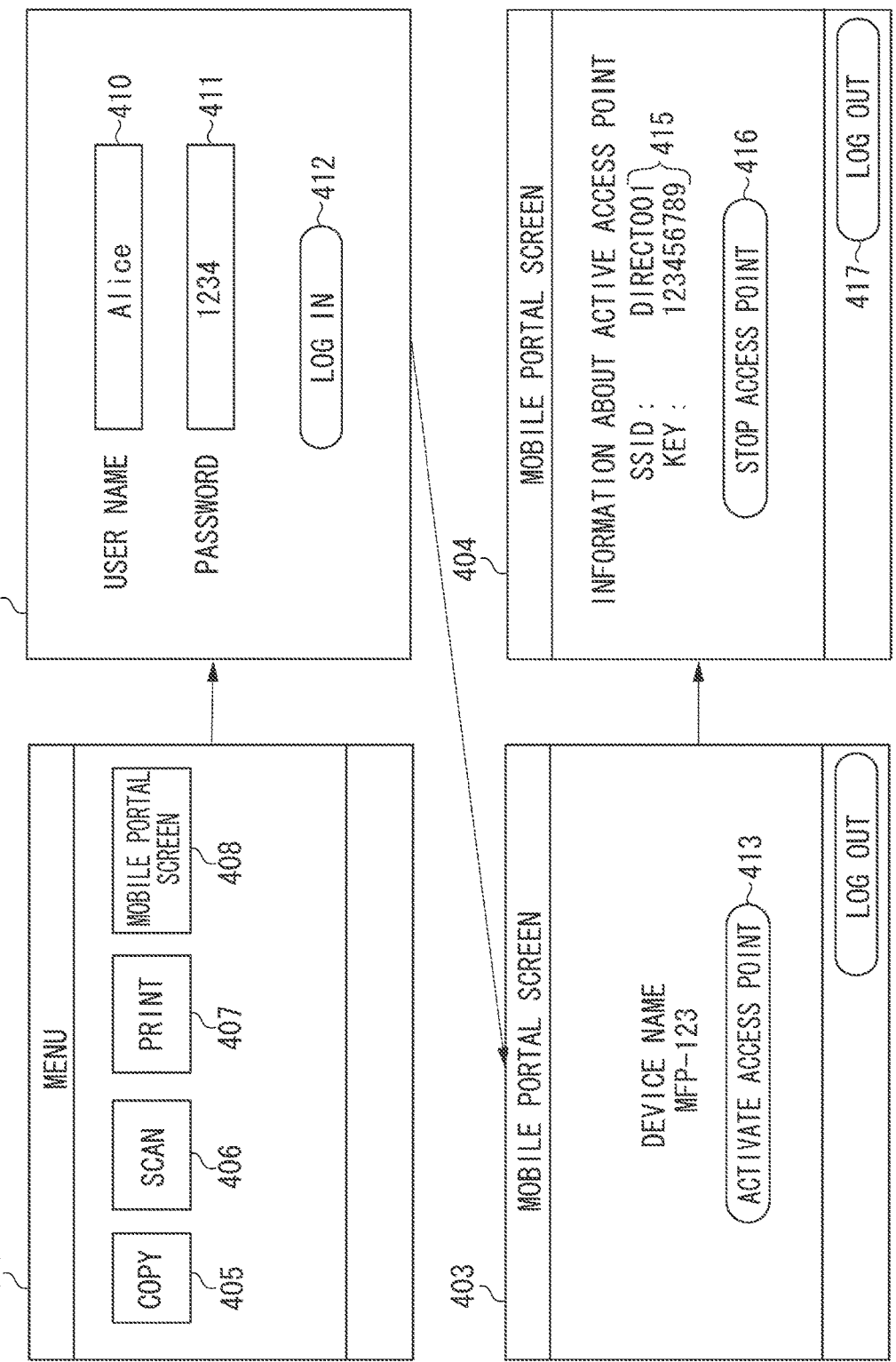
FIG. 4 is a diagram (a first diagram) illustrating an example of operation screens that are displayed on an operation unit of the printing apparatus.

FIG. 4 is a diagram illustrating an example of operation screens displayed on the operation unit 200 of the printing apparatus 110. The operation screens include a menu screen 401, a login screen 402, and mobile portal screens 403 and 404.

The menu screen 401 includes a button of a mobile portal screen 408 in addition to buttons of a copy 405, a scan 406, and a print 407. The printing apparatus 110 typically includes the copy 405, the scan 406, and the print 407. When the button of the mobile portal screen 408 on the menu screen 401 is selected, the menu screen 401 transitions to the login screen 402. The printing apparatus 110 authenticates a user based on a user name and a password input via the login screen 402. The printing apparatus 110 only displays the mobile portal screen 403 to the authenticated user who has authority to use the mobile portal screen 403. On the mobile portal screen 403, name of a device currently in use and an access point activation button 413 for activation of an access point are displayed. The user can issue an instruction for activation of the access point by selecting the access point activation button 413. When the access point activation button 413 is selected, the mobile portal screen 403 transitions to the mobile portal screen 404. On the mobile portal screen 404, wireless authentication information (wireless connection information) 415 and an access point stop button 416 are displayed. The wireless authentication information 415 includes an SSID and an authentication key for wireless connection to the mobile terminal 100. The access point stop button 416 is used for access point stop processing.

The aforementioned authentication function has been described using a function-basis authentication function by which authentication is performed on an application basis. There are additional functions such as a non-authentication function and a device authentication function. A user with administrator authority can set a function.

A usage type of a mobile portal screen at the time of each authentication function is illustrated in Table 1:

TABLE 1

USAGE TYPE OF MOBILE PORTAL SCREEN
AT TIME OF EACH AUTHENTICATION FUNCTION

|  |  | NOT AUTHENTICATED | AUTHENTICATED |
|---|---|---|---|
| NON-AUTHENTICATION |  | ✓ | — |
| DEVICE AUTHENTICATION |  | — | ✓ |
| FUNCTION-BASIS AUTHENTICATION | AUTHENTICATION WITH RESPECT TO MOBILE PORTAL SCREEN IS NECESSARY | — | ✓ |
|  | AUTHENTICATION WITH RESPECT TO MOBILE PORTAL SCREEN IS NOT NECESSARY | ✓ | ✓ |

In the non-authentication, since user authority information is not checked, any user can use a wireless LAN direct function from a mobile portal screen 503.

In the device authentication, an authentication screen 501 is displayed on the operation unit 200, as illustrated in FIG. 5, when a user is to use a function of the printing apparatus 110. After the user is authenticated, a menu screen 502, as illustrated in FIG. 5, is displayed. In the case where a user may not have authority to use the mobile portal screen 503, the CPU 205 displays the menu screen 502 with the button of a mobile portal screen 510 in an unavailable state.

In the function-basis authentication, processing performed by the printing apparatus 110 differs depending on whether authentication with respect to a mobile portal screen is necessary. If authentication with respect to the mobile portal screen 503 is not necessary, any user can use the wireless LAN direct function from the mobile portal screen 503, similar to the case of the non-authentication. If authentication with respect to the mobile portal screen 503 is necessary, the CPU 205 checks authority of the authenticated user. If the authenticated user has authority to use the mobile portal screen 503, the CPU 205 displays the mobile portal screen 503 on the operation unit 200. If the authenticated user does not have the authority, the CPU 205 displays a message such as "you do not have authority to use the mobile portal screen" on the operation unit 200. When a user selects an access point activation button 511 on the mobile portal screen 503, the printing apparatus 110 activates an access point. Then, the printing apparatus 110 displays a mobile portal screen 504.

The authentication control service 316 includes a user account management function and a login function as described below.

The user account management function provides a user with a user interface (e.g., a screen) for registering or managing a user account. The user account management function records information registered via the user interface in the user DB 317, and manages the recorded information. Examples of the information to be managed include a user name, a password, an IC card number, and authority information and are stored as illustrated in Table 2 (e.g., a user information list).

TABLE 2

| Administrator | password0 | 01a1b2c3d4e5f6g0 | AUTHORIZED TO USE MOBILE PORTAL SCREEN |
| Guest |  |  | NOT AUTHORIZED TO USE MOBILE PORTAL SCREEN |
| Alice | password1 | 01a1b2c3d4e5f6g1 | AUTHORIZED TO USE MOBILE PORTAL SCREEN |

TABLE 2-continued

| | | | |
|---|---|---|---|
| Bob | password2 | 01a1b2c3d4e5f6g2 | AUTHORIZED TO USE MOBILE PORTAL SCREEN |
| Carol | password3 | 01a1b2c3d4e5f6g3 | AUTHORIZED TO USE MOBILE PORTAL SCREEN |
| Dave | password4 | 01a1b2c3d4e5f6g4 | AUTHORIZED TO USE MOBILE PORTAL SCREEN |

The login function provides a user who uses the operation unit 200 with a login and logout function. The CPU 205 displays the login screen 402 on the operation unit 200 to prevent a user who has not logged in from using an application for which the user does not have authority. At the same time, the CPU 205 sets the number of users who can log in the operation unit 200 to 1. Thus, a plurality of users cannot concurrently log in from the operation unit 200. When the login of the user succeeds, the CPU 205 causes a screen of the operation unit 200 to transition from the login screen 402 to the mobile portal screen 403 serving as an application screen. This enables the user to use the printing apparatus 110. The CPU 205 provides a plurality of login units so that a user can login in. For example, the CPU 205 provides the following login units:

Keyboard Login Unit

The CPU 205 displays a soft keyboard on the login screen 402 of the operation unit 200. When detecting selection of a login button 412, the CPU 205 acquires a user name 410 and a password 411 that have been input to perform user authentication. Then, the CPU 205 performs login processing.

IC Card Login Unit

The CPU 205 acquires an IC card number from an IC card held over the IC card reader 201 to identify a user, and then performs login processing.

Normally, the authentication control service 316 authenticates a user based on whether a user name and a password acquired by the keyboard login unit or an IC card number acquired by the IC card login unit match with a user name and a password or an IC card number registered in the user DB 317. The authentication control service 316 can cooperate with a user authentication server (not illustrated) connected via a wired LAN. In such a case, the authentication control service 316 authenticates a user based on whether an acquired user name and password or an IC card number match with a user name and a password or an IC card number registered in the server. Examples of the user authentication server include a lightweight directory access protocol (LDAP) server, Microsoft® Active Directory®, and an original server.

When a user logs in, the authentication control service 316 generates an object in which information of the login user is recorded and records the generated object in the RAM 203. Hereinafter, the object in which information of the login user is recorded is referred to as a login context. Examples of information to be recorded in the login context are illustrated in Table 3:

TABLE 3

LOGIN CONTEXT INFORMATION LIST

| ITEM | VALUE |
|---|---|
| USER NAME | Alice |
| DOMAIN NAME | localhost |
| AUTHORITY INFORMATION | AUTHORIZED TO USE MOBILE CONNECTION |

The authentication control service 316 arranges an area in which a domain name is recorded in the login context, so that a user account registered in the user DB 317 and a user account managed by the user authentication server are distinguished from each other as different accounts. For example, if a user who is registered in the user DB 317 logs in, the authentication control service 316 records a character string of localhost in the area in which a domain name is recorded. If a user logs in using a user account managed by the user authentication server, the authentication control service 316 records a domain name or a server name as a character string in the area in which a domain name is recorded. Table 4 illustrates an example of information to be recorded in a login context when a user logs in using the user account managed by the server:

TABLE 4

LOGIN CONTEXT INFORMATION LIST AT TIME OF SERVER AUTHENTICATION

| ITEM | VALUE |
|---|---|
| USER NAME | Alice |
| DOMAIN NAME | DomainA |
| AUTHORITY INFORMATION | AUTHORIZED TO USE MOBILE PORTAL SCREEN |

When detecting selection of a logout button 417 displayed on the operation unit 200, the CPU 205 deletes the information recorded in the login context and displays the menu screen 401 on the operation unit 200 again.

Next, functional restriction of the printing apparatus 110 is described with reference to FIG. 6.

The printing apparatus 110 includes a function of setting functional restriction so that a function usable by each user can be restricted. FIG. 6 illustrates an example a screen via which a user account is registered. Restriction information can be set from a user account registration screen 601. A user who has authority illustrated in FIG. 6 is restricted in use of an application retained by the printing apparatus 110. In FIG. 6, since the user has authority to use the mobile portal screen 403, the user can use a mobile portal screen function.

As described above, the login context includes authority information, and the administrator of the printing apparatus 110 allocates the authority information on a user basis. Accordingly, the user authority can be set.

Next, an example of information processing performed by the printing apparatus 110 according to the present exemplary embodiment is described with reference to a flowchart illustrated in FIG. 7.

In a case where users who can access the mobile portal are not limited, a security problem occurs. Thus, the printing apparatus 110 sets up a function-basis authentication function to restrict use of the mobile portal.

When a user uses a mobile portal function of the printing apparatus 110 by logging into the printing apparatus 110 via the printing apparatus' 110 operation unit 200, the user selects a button of the mobile portal screen 408 on the menu screen 401 displayed on the printing apparatus' 110 operation unit 200. In step S702, the CPU 205 detects that the button of the mobile portal screen 408 on the menu screen 401 is selected by the user.

The CPU 205 requests the user to log into the printing apparatus 110 according to function-basis authentication. More specifically, the CPU 205 displays the login screen 402 on the operation unit 200 to request the user to input a user name and a password. The user inputs a user name 410 and a password 411 of the user on the login screen 402.

In step S703, when the CPU 205 receives the inputs of the user name and the password, the CPU 205 refers to user information to start login processing.

In step S704, the CPU 205 determines whether authentication has succeeded based on a result of the login processing. If the CPU 205 determines that the authentication has succeeded (YES in step S704), the operation proceeds to step S705. If the CPU 205 determines that the authentication has failed (NO in step S704), the operation of the flowchart illustrated in FIG. 7 ends.

In step S705, the CPU 205 generates a login context.

In step S706, the CPU 205 checks authority information of the user who has logged in (login user). More specifically, the CPU 205 checks the authority information of the user that is set via the screen illustrated in FIG. 6 and stored in a component such as the HDD 204 and determines whether the login user has authority to use a mobile portal screen function. If the CPU 205 determines that the login user has the authority (YES in step S706), the operation proceeds to step S707. If the CPU 205 determines that the login user does not have the authority (NO in step S706), the operation of the flowchart illustrated in FIG. 7 ends.

In step S707, the CPU 205 determines whether an access point is already activated based on, for example, an operation state of a module that provides an access point function. The CPU 205 can determine whether the access point is already activated based on whether a wireless login context, described below, is stored in the login context storage RAM 318. If the CPU 205 determines that the access point is already activated (YES in step S707), the operation proceeds to step S721. If the CPU 205 determines that the access point is not activated (NO in step S707), the operation proceeds to step S708. In a case where the user logs out from the printing apparatus 110 in a state in which the access point is activated, the printing apparatus 110 maintains the state in which the access point is activated. A subsequent user can log into the mobile terminal 100 in such a state. In such a case, in step S707, the CPU 205 determines that the access point is already activated.

In step S708, the CPU 205 displays the mobile portal screen 403 on the operation unit 200 and determines whether an access point activation request has been received. The user requests activation of the access point by selecting the access point activation button 413 on the mobile portal screen 403. If the CPU 205 determines that the access point activation request has been received (YES in step S708), the operation proceeds to step S709. If the CPU 205 determines that the access point activation request has not been received (NO in step S708), the operation proceeds to step S712.

In step S709, when the access point function is started, the CPU 205 stores a new wireless login context (Table 5) in the login context storage RAM 318. The new wireless login context links the SSID generated when the access point function is started with the login context generated in step S705.

TABLE 5

LOGIN CONTEXT INFORMATION LIST AT TIME OF ACTIVATION OF ACCESS POINT

| ITEM | VALUE |
| --- | --- |
| USER NAME | Alice |
| DOMAIN NAME | DomainA |
| SSID | DIRECT001 |

The CPU 205 rejects the wireless login context when the access point function shifts to a stop state. The CPU 205 does not reject the wireless login context when the user logs out.

In step S710, the CPU 205 registers wireless authentication information in the NFC I/F 211 so that the wireless authentication information can be transmitted via NFC communication.

In step S711, the CPU 205 displays the wireless authentication information 415, including an authentication key and an SSID for wireless LAN access point connection, on the mobile portal screen 404. The user inputs the authentication key and the SSID displayed on the mobile portal screen 404 into the mobile terminal 100 thereof, so that the mobile terminal 100 can be directly connected to the printing apparatus 110. The processing in step S711 is an example of display control processing.

In step S712, the CPU 205 transitions to a logout processing standby state. If the CPU 205 determines that the logout processing has been executed (YES in step S712), the operation proceeds to step S713. If the CPU 205 determines that the logout processing has not been executed (NO in step S712), the processing in step S712 is repeated.

In step S713, the CPU 205 rejects the wireless authentication information registered in step S710 so that the wireless authentication information is not transmitted via the NFC communication.

In step S721, the CPU 205 determines whether the current login user is the user who has started the access point function. The CPU 205 compares a user name and a domain name in the login context (Table 3) stored in the login context storage RAM 318 with a user name and a domain name in the wireless login context (Table 5) in the login context storage RAM 318 to make a determination. If the CPU 205 determines that the login user and the user who has started the access point function are the same (YES in step S721), the operation proceeds to step S710. If the CPU 205 determines that the login user and the user who has started the access point function are different (NO in step S721), the operation proceeds to step S722.

Figure 8:
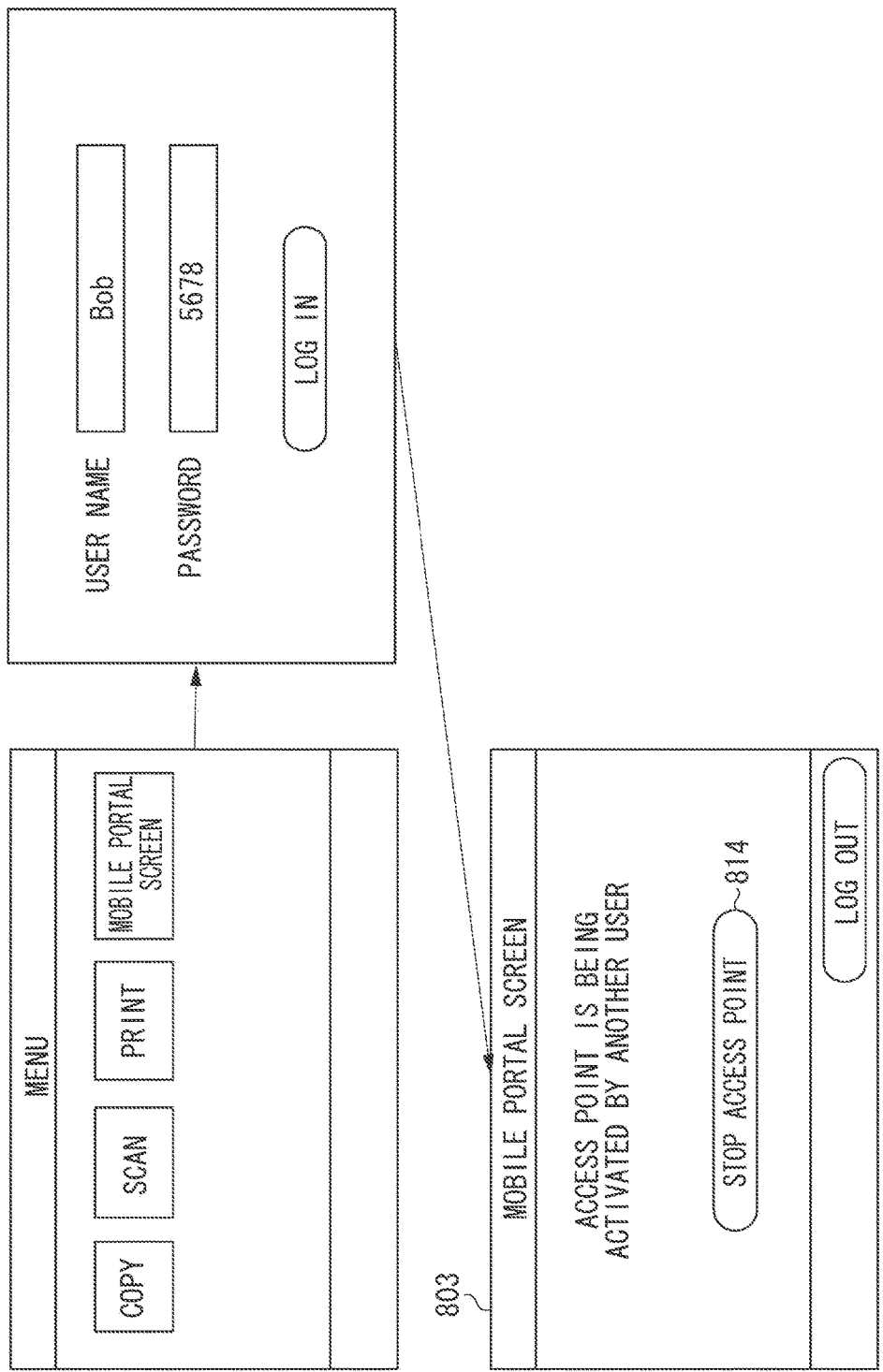
FIG. 8 is a diagram (a third diagram) illustrating an example of operation screens displayed on an operation unit of the printing apparatus.

In step S722, the CPU 205, for example, displays a message on the operation unit 200 indicating that the access point function is being used by another user as illustrated in FIG. 8. FIG. 8 is a diagram illustrating an example of a mobile portal screen displayed when the user who has started the access point function is different from the login user. The user selects an access point stop button 814 on a mobile portal screen 803, thereby requesting a stop of the access point function. The processing in step S722 is an example of display control processing. The mobile portal screen 803 is an example of a predetermined screen.

According to the processing of the flowchart illustrated in FIG. 7, the printing apparatus 110 can reduce the possibility that an SSID or an authentication key used in the access point function activated by a certain user is referred to by other users, and can ensure connectivity to the user who has activated the access point function.

A second exemplary embodiment will be described below. In the present exemplary embodiment, a printing apparatus 110 includes an individual-basis SSID function with an individual-basis SSID that is a dedicated SSID allocated to each user and a fixed-SSID function with a fixed SSID that can be used by a plurality of users at the same time. An example of an operation performed by the printing apparatus 110 will be described below with reference to FIGS. 9 and 10.

Figure 9:
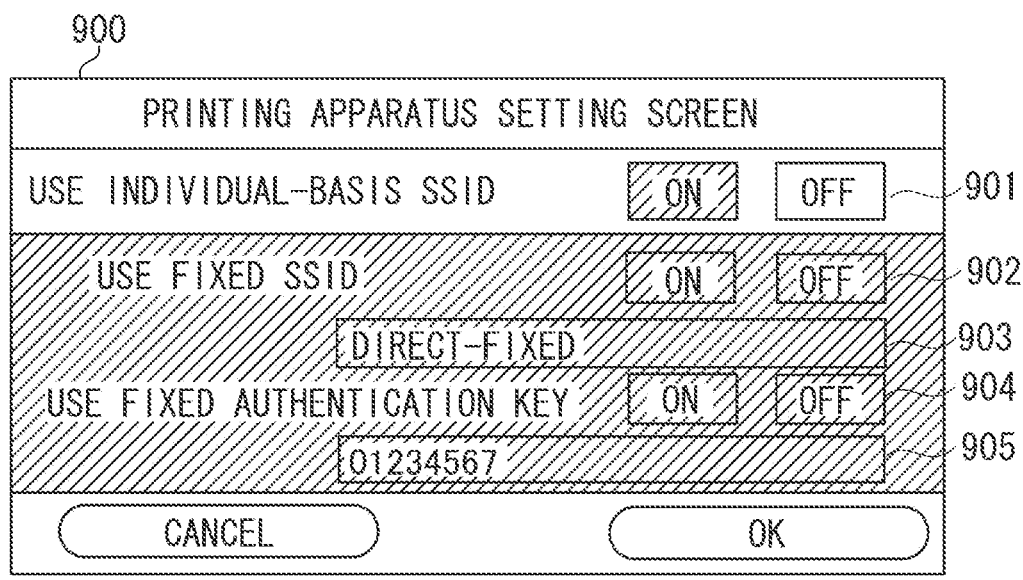
FIG. 9 is a diagram illustrating an example of a printing apparatus setting screen.

FIG. 9 is a diagram illustrating an example of a screen on an operation unit 200 in a printing apparatus setting 305 of the printing apparatus 110. A printing apparatus setting screen 900 includes an individual-basis SSID setting 901, a fixed SSID setting 902, a fixed SSID input field 903, a fixed authentication key setting 904, and a fixed authentication key input field 905. When the individual-basis SSID setting 901 is valid, a CPU 205 uses a login context and a serial number unique to a device to generate unique SSID and authentication key in a wireless LAN control service 314. Alternatively, a user can set optional SSID and authentication key in the printing apparatus 110. As for each of the fixed SSID and the fixed authentication key, the CPU 205 uses an optional character string that is set by a printing apparatus administrator. When the fixed SSID and the fixed authentication key are valid, all users who log in the printing apparatus 110 can use this SSID. When the individual-basis SSID and the fixed SSID/authentication key are exclusively operated, and the individual-basis SSID setting 901 is valid, the fixed SSID setting 902 and the fixed authentication key setting 904 cannot be valid. Since the individual-basis SSID is unique to each user, the individual-basis SSID should not be disclosed to other users from a security standpoint. The printing apparatus setting 305 stores printing apparatus setting information that, for example, is set on the printing apparatus setting screen 900 in a HDD 204. The printing apparatus setting screen 900 is an example of a screen on which a type of SSID to be used by an access point function is set. The individual-basis SSID is an example of a specific type of SSID.

Next, an example of information processing performed by the printing apparatus 110 of the present exemplary embodiment is described with reference to a flowchart illustrated in FIG. 10.

In a case where users who can access the mobile portal are not limited, a security problem occurs. Thus, the printing apparatus 110 includes a function-basis authentication function to restrict use of the mobile portal.

When a user uses a mobile portal function of the printing apparatus 110 by logging into the printing apparatus' 110 operation unit 200, the user selects a button of a mobile portal screen 408 on a menu screen 401 displayed on the printing apparatus' 110 operation unit 200. In step S1002, the CPU 205 detects that the button of the mobile portal screen 408 on the menu screen 401 is selected by the user.

The CPU 205 requests the user to log in the printing apparatus 110 according to function-basis authentication. More specifically, the CPU 205 displays the login screen 402 on the operation unit 200 to request the user to input a user name and a password. The user inputs a user name 410 and a password 411 of the user on the login screen 402.

In step S1003, when the CPU 205 receives the inputs of the user name and the password, the CPU 205 refers to user information to start login processing.

In step S1004, the CPU 205 determines whether authentication has succeeded based on a result of the login processing. If the CPU 205 determines that the authentication has succeeded (YES in step S1004), the operation proceeds to step S1005. If the CPU 205 determines that the authentication has failed (NO in step S1004), the operation of the flowchart illustrated in FIG. 10 ends.

In step S1005, the CPU 205 generates a login context.

In step S1006, the CPU 205 checks authority information of the login user. More specifically, the CPU 205 checks the authority information of the user that is set via the screen illustrated in FIG. 6 and stored in a component such as the HDD 204, and determines whether the login user has authority to use a mobile portal screen function. If the CPU 205 determines that the login user has the authority (YES in step S1006), the operation proceeds to step S1007. If the CPU 205 determines that the login user does not have the authority (NO in step S1006), the operation of the flowchart illustrated in FIG. 10 ends.

In step S1007, the CPU 205 determines whether an access point is already activated based on, for example, an operation state of a module that provides an access point function. The CPU 205 can determine whether the access point is already activated based on whether a wireless login context is stored in a login context storage RAM 318. If the CPU 205 determines that the access point is already activated (YES in step S1007), the operation proceeds to step S1021. If the CPU 205 determines that the access point is not activated (NO in step S1007), the operation proceeds to step S1008.

In step S1008, the CPU 205 displays a mobile portal screen 403 on the operation unit 200 and determines whether an access point activation request has been received. The user requests activation of the access point by selecting the access point activation button 413 on the mobile portal screen 403. If the CPU 205 determines that the access point activation request has been received (YES in step S1008), the operation proceeds to step S1009. If the CPU 205 determines that the access point activation request has not been received (NO in step S1008), the operation proceeds to step S1012.

In step S1009, the CPU 205 checks whether the individual-basis SSID setting set on the printing apparatus setting screen 900 is valid. If the individual-basis SSID setting is valid, the CPU 205 activates an access point by using the individual-basis SSID. If the individual-basis SSID setting is invalid, the CPU 205 activates an access point by using a fixed SSID. This enables the user to use a wireless LAN access point function of the printing apparatus 110. When the access point function is started, the CPU 205 stores a new wireless login context in the login context storage RAM 318. The new wireless login context links the SSID used when the access point is activated with the login context generated in step S1005.

In step S1010, the CPU 205 registers wireless authentication information in an NFC I/F 211 so that the wireless authentication information can be transmitted via NFC communication.

In step S1011, the CPU 205 displays an authentication key and an SSID for wireless LAN access point connection on the mobile portal screen 404. The user inputs the authentication key and the SSID displayed on the mobile portal screen 404 into the mobile terminal 100 so that the mobile terminal 100 can be directly connected to the printing apparatus 110. Herein, if the access point is activated by using an individual-basis SSID, the individual-basis SSID and an authentication key corresponding to the individual-basis SSID are displayed on the mobile portal screen 404. If the access point is activated by using a fixed SSID, the fixed SSID and a fixed authentication key are displayed on the mobile portal screen 404. The processing in step S1011 is an example of display control processing.

In step S1012, the CPU 205 transitions to a logout processing standby state. If the CPU 205 determines that the logout processing is executed (YES in step S1012), the operation proceeds to step S1013. If the CPU 205 determines that the logout processing is not executed (NO in step S1012), the processing in step S1012 is repeated.

In step S1013, the CPU 205 rejects the wireless authentication information registered in step S1010 so that the wireless authentication information is not transmitted via the NFC communication.

In step S1021, the CPU 205 checks whether the access point is being activated by using the individual-basis SSID based on, for example, printing apparatus setting information that has been set on the printing apparatus setting screen 900 and stored in the HDD 204. If the CPU 205 determines that the access point is being activated by using the individual-basis SSID (YES in step S1021), the operation proceeds to step S1031. If the CPU 205 determines that the access point is being activated by using a fixed SSID (NO in step S1021), the operation proceeds to step S1010.

In step S1031, the CPU 205 determines whether the current login user is the user who has started the access point function. The CPU 205 compares a user name and a domain name in the login context stored in the login context storage RAM 318 with a user name and a domain name in the wireless login context stored in the login context storage RAM 318 to make a determination. If the CPU 205 determines that the login user and the user who has started the access point function are the same (YES in step S1031), the operation proceeds to step S1010. If the CPU 205 determines that the login user and the user who has started the access point function are different (NO in step S1031), the operation proceeds to step S1032.

In step S1032, the CPU 205 displays a message on the operation unit 200 indicating that the access point function is being used by another user. The processing in step S1032 is an example of display control processing.

According to the processing of the flowchart illustrated in FIG. 10, the printing apparatus 110 can reduce the possibility that an authentication key or an individual-basis SSID that is not only unique to each user, but also confidential information, is referred to by other users.

One or more functions of each of the above-described exemplary embodiments can be realized as a program supplied to a system or an apparatus via a network or a storage medium. The system or the apparatus includes a computer with one or more processors that can read and execute the program. The functions of each of the above-described exemplary embodiments can also be realized by using a circuit (e.g., an application specific integrated circuit (ASIC)) for providing one or more of the functions.

The above-described exemplary embodiments are not seen to be limiting.

According to each of the above exemplary embodiments, the risks of wireless authentication information leakage to other users can be reduced.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus including an access point function comprising:
 a display; and
 one or more processors that execute a set of instructions to perform operations to:
 start the access point function using a variable service set identifier (SSID) associated with a login user of the information processing apparatus;
 determine whether a user who is currently logged into the information processing apparatus matches a user who issued an instruction for starting the access point function; and
 control the display to display the SSID in a case where it is determined that the user who is currently logged into the information processing apparatus matches the user who issued the instruction for starting the access point function and not to display the SSID in a case where it is determined that the user who is currently logged into the information processing apparatus does not match the user who issued the instruction for starting the access point function.

2. The information processing apparatus according to claim 1, the operations further comprising setting a type of an SSID to be used by the access point function,
 wherein, in a case where the determining determines that the user who is currently logged into the information processing apparatus does not match the user who issued the instruction for starting the access point function and a specific type of SSID is set to be used, the controlling controls the display not to display the SSID and, in a case where another type of SSID that is different from the specific type of SSID is set, the controlling controls the display to display the SSID even if the determining determines that the user who is currently logged into the information processing apparatus does not match the user who issued the instruction for starting the access point function.

3. The information processing apparatus according to claim 2, wherein the specific type of SSID is an individual-basis SSID.

4. The information processing apparatus according to claim 2, wherein the another type of SSID is a fixed SSID.

5. The information processing apparatus according to claim 1, wherein the controlling controls the display to display a message indicating that another user has started the access point function when the SSID is not displayed.

6. The information processing apparatus according to claim 5, wherein the controlling controls the display to display a button for stopping the access point function.

7. The information processing apparatus according to claim 1, wherein the information processing apparatus is a printing apparatus.

8. A method for controlling an information processing apparatus including an access point function, the method comprising:
   starting the access point function using a variable service set identifier (SSID) associated with a login user of the information processing apparatus;
   determining whether a user who is currently logged into the information processing apparatus matches a user who issued an instruction for starting the access point function;
   permitting the information processing apparatus to display the SSID in a case where it is determined that the user who who is currently logged into the information processing apparatus matches the user who issued the instruction for starting the access point function; and
   prohibiting the information processing apparatus from displaying the SSID in a case where it is determined that the user who is currently logged into the information processing apparatus does not match the user who issued the instruction for starting the access point function.

9. The method according to claim 8, further comprising setting a type of an SSID to be used by the access point function, wherein, in a case where it is determined that the user who is currently logged into the information processing apparatus does not match the user who issued the instruction for starting the access point function and a specific type of SSID is set to be used, the SSID is not displayed and, in a case where another type of SSID that is different from the specific type of SSID is set, the the SSID is displayed even if the determining determines that the user who is currently logged into the information processing apparatus does not match the user who issued the instruction for starting the access point function.

10. The method according to claim 9, wherein the specific type of SSID is an individual-basis SSID.

11. The method according to claim 9, wherein the another type of SSID is a fixed SSID.

12. The method according to claim 8, further comprising displaying a message indicating that another user has started the access point function when the SSID is not displayed.

13. The method according to claim 12, wherein the controlling controls the display to display a button for stopping the access point function.

14. A non-transitory computer-readable storage medium storing computer executable instructions which, when executed, cause a computer to execute a method for controlling an information processing apparatus including an access point function, the method comprising:
   starting the access point function using a variable service set identifier (SSID) associated with a login user of the information processing apparatus;
   determining whether a user who is currently logged into the information processing apparatus matches a user who issued an instruction for starting the access point function;
   permitting the information processing apparatus to display the SSID in a case where it is determined that the user who who is currently logged into the information processing apparatus matches the user who issued the instruction for starting the access point function; and
   prohibiting the information processing apparatus from displaying the SSID in a case where it is determined that the user who is currently logged into the information processing apparatus does not match the user who issued the instruction for starting the access point function.

* * * * *